3,182,746
VOICE BOX FOR AURAL TRAINING
Frederic J. Schaefer II, Miami, Fla., assignor to
William W. Fagan, Miami, Fla.
Filed Dec. 4, 1962, Ser. No. 242,147
2 Claims. (Cl. 181—20)

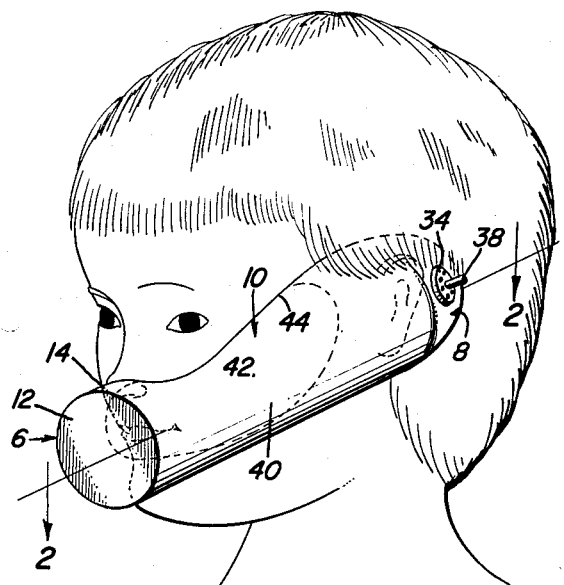
Fig. 1
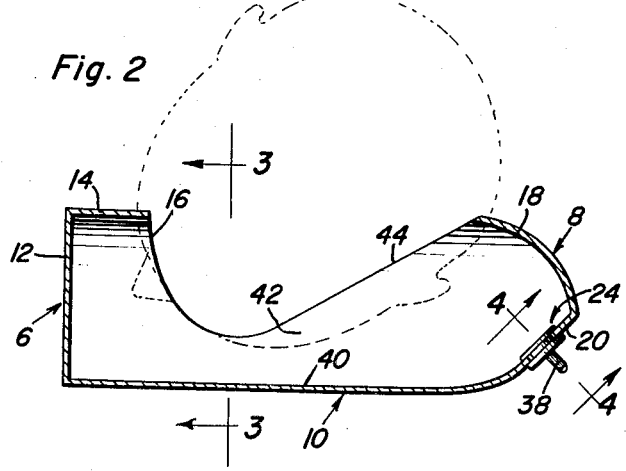
Fig. 2
Fig. 3
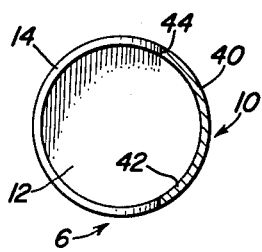
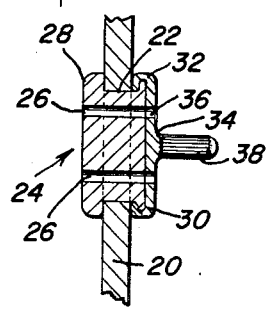
Fig. 4
Frederic J. Schaefer, II
INVENTOR.

The present invention relates to a manually usable and practical mechanical appliance or implement which is expressly designed and adapted for use under the supervision and direction of a speech therapist, a voice teacher or anyone skilled in the art of teaching correct enunciation, pronouncing of words, syllables thereof, and voice utterances in general.

A recognized speech therapist or one qualified to teach the essential skill of listening and voice training and pronunciation of a given language, particularly for the handicapped child requiring training and treatment will be enthusiastically interested in prospects for success in solving the needs of users seeking to acquire confidence in the ability to listen, learn and speak clearly. Among the basic skills acquired by a child in an elementary school, attentive comprehensible listening is universally recognized as indispensibly important by educators. The listening skill of the child must be trained and, as nearly as possible, perfected simultaneously with other necessary motor and mental abilities, preferably under the guidance of a teacher specializing in this line of endeavor. Research has statistically reasoned that the average person will listen to a book a day, speak a so-called "book" a week, read a book a month and perhaps write a book a year. Persons conversant with the subject matter of the invention herein under advisement are aware that there are many books, teaching devices and machines to help develop the prerequisite academic skills of the child, particularly the handicapped one.

Included in the available marketed media are books on listening and state-adopted textbooks on phonetics. Even so and nevertheless there is apparently no recognized or endorsed teaching device, machine or the like available to both teacher and student which is expressly designed for the particular purpose of cultivating the listening skill and appreciably aiding in the teaching of phonetics. Evidently the presently used and popular tape recorders approach an answer to the need but are regarded as falling short of reaching the desired goal. Not only this, the expense of buying and owning a reliable tape recorder often places its ownership beyond the pale of both students and teachers. Then, too, the fidelity of a tape recorder is thought not to be adequate, at least in most instances, to prove of value in teaching aptly and reliably the phonetic and listening needs herein under advisement. Furthermore, the mechanics involved in rewinding a tape recorder lessen its value in the field of effort under advisement because obviously the child quickly forgets what is expected of his contemplated performance.

It follows that an objective in the instant matter and presentation is to comply with the need for and use of a simple and expedient listening and teaching device the use of which will stimulate listening interest and will unquestionably aid in the teaching of phonetics. In devising a preferred embodiment of the invention an adaptation of unusual simplicity of construction and design has been evolved and produced. It is such that it makes itself unique as a teaching device which is susceptible of use by all students, if necessary, in elementary grades. In terms of cost the economy of the present invention will make it available to all students or State Departments of Education, in fact to the extent that it might constitute an issuable item in the category of books and contrivances categorized therewith. Through the medium of the device or implement the child is enabled to listen to his own voice exactly and at the same that his words are spoken whereby to enable him to make finepoint phonetic discrimination whereby the device serves as a motivating factor destined to promote better listening and quick and reliable learning, the skills of speaking and listening and the consequent achievement of such goals as may be set for acceptable grammar, reading, writing and, what is significantly important, spelling.

Despite the simplicity of the purely mechanical appliance shown the user can be expected to achieve maximum possible function in due time. The teacher as an observer can evaluate the user, prescribe whatever is necessary for good results and promote efficiency of accomplishment wherein the appliance will meet the individual needs of users.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in perspective of an appliance constructed in accordance with the principles of the present invention and showing the manner in which it is adapted to be used (the holding hand being omitted for clearness of illustration);

FIGURE 2 is a longitudinal sectional view on the plane of the section line 2—2 of FIGURE 1 looking in the direction of the indicating arrows;

FIGURE 3 is a cross-section on the transverse section line 3—3 of FIGURE 2; and

FIGURE 4 is a section on an enlarged scale taken on the plane of the line 4—4 of FIGURE 2.

With the invention constructed and used as illustrated it will be evident that it comprises in a manner of speaking a simple and economical voice box through the medium of which the user's voice is heard without distortion and yet with greatly increased auditory awareness. Consequently, he is able to develop listening skill, auditory discrimination based on a correctly articulated sound, will be able to note the differential between articulation and the reception of sound by the auditory nerves. In fact, bone conduction as a result of the use of the implement is another factor to be taken into account in evaluating the subject matter of the invention.

The appliance is preferably of onepiece construction and characterized by three cooperating component parts or portions; namely, the so-called voice box 6, the earpiece or receiver 8 and the intervening connecting means 10 which constitutes the trapping and channeling connector between the components 6 and 8.

The mouthpiece or voice box 6 is preferably of circular cross-section and bears the resemblance of a cup of requisite depth. The cup includes a disk-like bottom 12 which is, of course, imperforate and an encircling lateral rim 14 which has an edge portion 16 properly contoured to conformingly fit the facial features of the user as generally illustrated in FIG. 2. The cup 6 is at the forward end and the earpiece or receiver 8 at the rearward end and the latter is in the form of a hollow shell or shield which is suitably shaped to include a circumscribing rim portion 19 and a somewhat flattened circular portion 20. This portion 20 as shown in FIGURE 4 is provided with an opening 22 into which the body of a fitting is plugged, the fitting being denoted generally at 24 and the body portion having circumferentially spaced open-ended bores 26. There is a retaining flange 28 on the left side and a similar assembling but smaller flange 30 on the right side which flange serves to accommodate the turnable encircling channel-rim 32 of a turnable valve or disk 34. This part 34 is provided with orifices 36 which are selectively registrable with the vents or passages 26 and at the center a suitably knurled fingergrip 38 is provided so that the valve may be caught hold of and turned whereby to provide a means on the exterior which enables the teacher or other authorized person to speak to the user while the device is being used in the manner illustrated in FIGURES 1 and 2. The intervening central portion 10 is channel-shaped and affords communication between the two parts 6 and 8 and includes a bight or wall portion 40 and side walls or flanges 42 the edges being suitably contoured as at 44 to fit against the cheek of the user in the manner illustrated.

In the classroom the invention can be used as follows: The child (or children) being instructed would be given a "voice box" (FIG. 1) and told to place the components over both the ear and the mouth. If the teacher is giving instructions on the "F" sound, the child would be told to produce the sound into the voice box 6. Immediately the child would hear the sound exactly as he spoke it. If the lesson is on auditory training, the teacher might ask where the "F" sound occurs in a particular word, or how many sounds occur in a given word, such as C-A-T.

The process can develop from hearing sounds in words, to auditory training, to teaching particular sounds, to difficult blends and even to speech correction.

The teacher using this device working with children in the area of speech correction will realize a marked improvement in the attention the child gives by reason of the ability to hear his own voice and because he is striving to duplicate the phonetic directions given to him. It is known that the device captures the child's imagination because he is able to use the device himself as opposed to the long wait required to play back a tape of his voice, and which, because of the lack of bone conduction makes him feel he is not listening to his own voice. The use of this device should be of significant assistance to all speech therapists and teachers.

It is believed that a careful consideration of the description in conjunction with the views of the drawing will enable the reader to obtain a clear understanding of the subject matter of the invention, the features and advantages, mode of use and structural component parts. Therefore, a more extended description is thought to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is a follows:

1. An appliance of the class described comprising a hollow elongated body straight from end to end and having a central body portion substantially channel-shaped in cross-section, the channel portion thereof being open on one side and with the lengthwise edges shaped to conform to intimately contact the cheek of the user, a shallow imperforate cup at the forward end of said channel, a hollow shell at the rearward end of said channel, said shell having a marginal edge shaped to conform to the contour of the portions of the head of the user when said shell is in use, said shell having a wall portion removed from the immediate vicinity of the portion which encompasses the user's ear, said wall portion being flattened and provided with a fitting, said fitting having open-ended bores, said fitting being also provided with a rotatably mounted apertured valving element, said element provided with an outstanding fingergrip readily available to the teacher, whereby with the aid of the openable and closable apertures a valving result can be attained at the discretion of the teacher and so that the teacher may give the student instructions during which time the student can retain the implement in its fully unstable position.

2. A readily applicable and removable appliance for use by a child and through the medium of which the skill of attentive listening can be practiced and learned comprising: a onepiece implement capable of being held in the user's hand much in the manner that a telephone handpiece is customarily used, said implement embodying a mouthpiece at its forward end, an earpiece at the rearward end, and means connecting the mouthpiece and earpiece, said means being open on an inwardly disposed side which is adapted to be conformably fitted against the user's cheek to assist in trapping, concentrating and transmitting significant voice sounds from the user's mouth to his ear, said earpiece comprising an ear-enclosing shield which is enlarged and shaped to adapt itself to conformingly fit over and encompass the user's ear, said shield having an exterior side surface provided with readily accessible and variable aperture means allowing the teacher to regulate and control the functioning of said aperture means, whereby the teacher can, with the aid of said aperture means, speak or otherwise converse with the user during the time the appliance is being used and without requiring it to be removed from the user's ear.

References Cited by the Examiner

UNITED STATES PATENTS

| D. 189,450 | 12/60 | Cousino | 181—20 X |
| D. 193,343 | 8/62 | MacFarlane | 181—20 X |
| 2,327,620 | 8/43 | Cole. | |
| 2,754,365 | 7/56 | Walters | 181—23 X |

FOREIGN PATENTS

| 343,637 | 11/21 | Germany. |
| 214,420 | 4/41 | Switzerland. |
| 239,781 | 3/46 | Switzerland. |

LEYLAND M. MARTIN, *Primary Examiner.*

LEO SMILOW, *Examiner.*